United States Patent [19]

Sladek et al.

[11] 4,228,752
[45] Oct. 21, 1980

[54] SURFACE EFFECT BOAT

[76] Inventors: Theodore E. Sladek; Donald E. Maynard, both of P.O. Box 204, New Iberia, La. 70560

[21] Appl. No.: 646,142

[22] Filed: Jan. 2, 1976

Related U.S. Application Data

[63] Continuation-in-part of Ser. No. 531,904, Dec. 12, 1974, abandoned.

[51] Int. Cl.³ .............................................. B63B 1/38
[52] U.S. Cl. .................................... 114/67 A; 114/61; 114/283
[58] Field of Search .................... 114/61, 67 R, 67 A, 114/66.5 R, 283, 288

[56] References Cited

U.S. PATENT DOCUMENTS

| | | | |
|---|---|---|---|
| 1,412,848 | 4/1922 | Dunajeff | 114/67 R |
| 3,077,174 | 2/1963 | Cockerell | 114/67 A |
| 3,094,962 | 6/1963 | Goar | 114/66.5 R |
| 3,473,503 | 10/1969 | Gunther | 114/67 A |
| 3,559,608 | 2/1971 | Tattersall | 114/67 R |

FOREIGN PATENT DOCUMENTS 1264961  2/1972  United Kingdom ................ 114/67 A

*Primary Examiner*—Sherman D. Basinger

[57] ABSTRACT

The boat or craft disclosed includes two spaced parallel hulls that are connected together by a platform extending between the hulls. The platform and the two hulls form the top and sides of an air space beneath the boat with the hulls supporting the platform above the water. Curtains of flexible material are spaced longitudinally in the air space and extend downwardly from the platform and transversely between the hulls to close the forward and rearward ends of the air space, whereby the pressure in the air space can be maintained above ambient to provide an air cushion to support a portion of the gross weight of the boat. The hulls are designed to provide a buoyant force due to displacement that will support 100% of the design gross weight of the boat when there is no pressure in the air space and the boat is not moving or is moving at a relatively slow speed through the water. The hulls are also designed to provide hydrodynamic forces that will support the boat when the boat is moving at a relatively fast speed with no pressure in the air space and will provide hydrodynamic forces that will support between 25% and 40% of the gross design weight of the boat when the pressure in the air space is at design pressure and the boat is moving at a relatively fast speed.

1 Claim, 12 Drawing Figures

NO AIR PRESSURE

WITH AIR PRESSURE

NO AIR PRESSURE
STATIONARY OR LOW SPEED

NO AIR PRESSURE
PLANING SPEED

WITH AIR PRESSURE
PLANING SPEED

SURFACE EFFECT BOAT

This is a continuation-in-part application of an application filed Dec. 12, 1974, entitled "Surface Effect Boat" and given Ser. No. 531,904 now abandoned.

This invention relates to boats which are supported on the surface of the water by a cushion or bubble of pressurized air contained beneath the boat. This type of vessel is referred to generally as a "surface effect boat".

Conventional surface effect boats, such as shown in U.S. Pat. No. 3,559,608, use various wall means to contain pressurized air in an air space under the boat to support the boat above the water. The walls extend transverse the direction of travel of the boat and are usually curtains made of flexible material so they can give as required when a wave is encountered. The side walls may be made of flexible material or, as shown in the above-identified patent, they may be of rigid construction and provide sufficient displacement buoyancy to support the boat without air pressure in the air space. When operating, however, the side walls are designed to simply dip into the water to contain the air pressure and, thus, provide substantially no lift to the boat.

One problem with surface effect boats of this type is the reaction of the boat to waves. When a conventional planing hull encounters a wave, it experiences a bow-up pitching moment. In heavy seas, the hull, being forced to a bow-up pitching moment by one wave, is in a poor attitude for the second and it will slam downwardly causing very high gravitational loads on the boat structure, machinery, and people in the boat. These loads are usually the factors that limit the speed at which conventional planing hulls can operate in heavy seas.

A conventional surface effect boat reacts to waves in the opposite manner. These boats operate at a very low trim angle, usually zero degrees. When these boats encounter a wave, they lose lift forward which causes the boat to pitch downwardly. If it doesn't have time to recover before encountering the next wave, it will strike the wave pitched forwardly which will cause the boat to crash into the wave. Again, this results in structural stresses and discomfort to the passengers.

It is an object of this invention to provide a surface effect boat that provides a smoother ride than previous boats in rough water and that has stability and maneuverability whether or not it is supported by the air cushion.

It is another object of this invention to provide a surface effect boat having two parallel spaced hulls that provide the side walls of an air space and that also provide hydrodynamic forces sufficient to support between 25% and 40% of the design gross weight of the boat when the boat is operating at design air pressure and the boat is moving at or above planing speed; such hulls being designed to also provide hydrodynamic forces that will support 100% of the design gross weight when the boat is operating at or above planing speed and there is no presure in the air space so that when the bubble is lost while the boat is traveling at such speed, the boat will not lose stability or maneuverability completely.

It is another feature and object of this invention to arrange the hulls of the boat so that the hydrodynamic force provided by the hulls is located forward of the center of gravity of the boat while the upward force provided by the air cushion is located rearwardly of the center of gravity of the boat so that when the air cushion support is lost, the hydrodynamic force provided by the hulls will produce a "bow-up" moment on the boat to help keep the bow of the boat from crashing downwardly into the waves.

It is another feature and object of this invention to provide an improved arrangement for discharging air into the air space below the boat wherein the air is discharged against the forward seal so as to help maintain the forward seal in contact with the water at all times.

It is a further object of this invention to provide a surface effect boat with spaced parallel hulls that serve as side walls for the air space below the boat and that also are shaped to act as planing hulls when the boat is moving at planing speed to provide hydrodynamic forces sufficient to support from 20% to 40% of gross weight of the boat and that will react in the opposite manner to wave action from the surface effect supported portion to provide a smoother ride.

These and other objects, advantages and features of this invention will be apparent to those skilled in the art from a consideration of this specification, including the attached drawings and appended claims.

Figure 1:
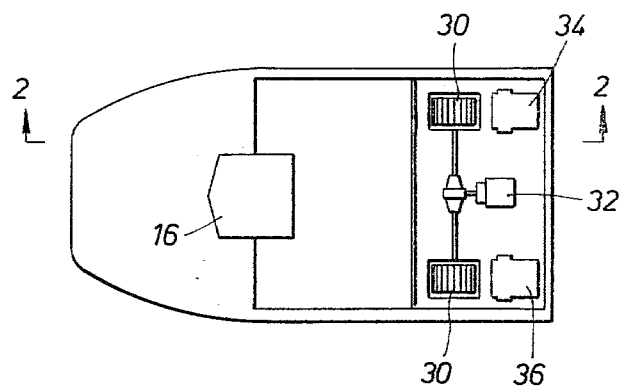
FIG. 1 is a plan view of a surface effect boat embodying the features of this invention.
Figure 3:
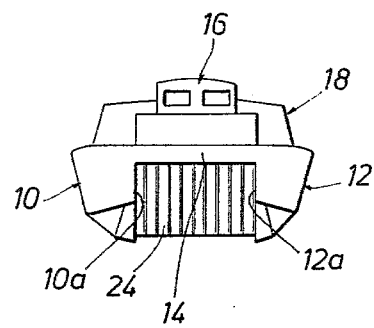
FIG. 3 is a front view of the boat of FIG. 1.
Figure 2:
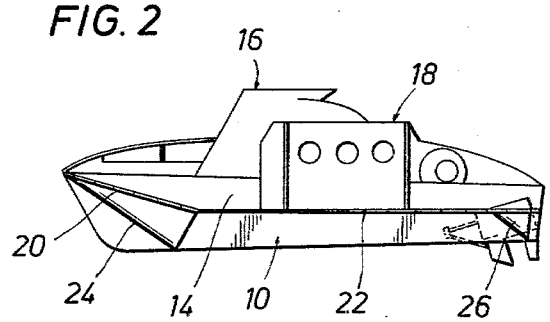
FIG. 2 is a sectional view taken along line 2—2 of FIG. 1.

The boat of FIGS. 1, 2, and 3 includes spaced parallel hulls 10 and 12 that are held in fixed relationship by platform 14 that extends between the hulls and which is rigidly connected to the hulls. The platform supports pilot house 16 and cabin 18.

As shown in FIG. 2, the lower surface of platform 14 has forward section 20 that is inclined upwardly in the direction of travel of the boat. Rearward section 22 is generally horizontal and both combine to define the upper surface of an air space between these surfaces and side walls 10a and 12a of the hulls. Two curtains 24 and 26 of flexible material are spaced longitudinally in the air space below the platform and extend between the hulls and between the platform and the water to close the ends of the air space to allow the air pressure therein to be maintained above ambient pressure.

Means are provided to supply the air space with pressurized air. In the embodiment shown, such means include blowers or fans 30 that are driven by engine 32. Ducts (not shown) carry the air to the air space. The boat is propelled through the water by engines 34 and 36 positioned rearwardly in hulls 10 and 12, respectively. These engines drive conventional propellers through appropriate gearing and shafts.

Figure 9A:
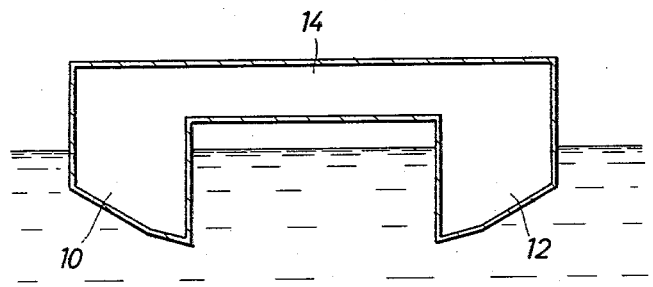
FIGS. 9A, 9B, and 9C show the boat of this invention in three modes of operation.
Figure 9B:
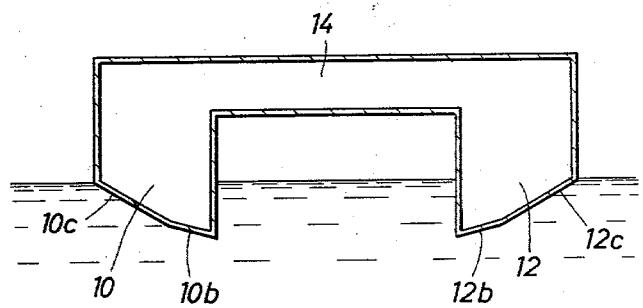
Figure 9C:
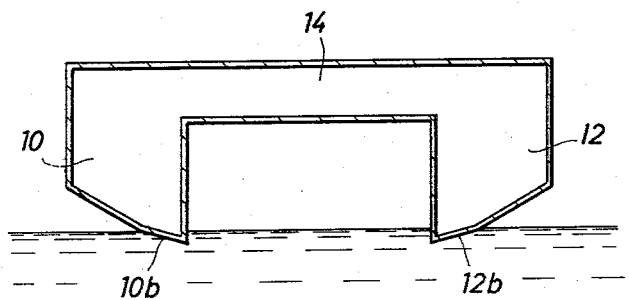

In accordance with this invention, hulls 10 and 12 are designed as planing hulls. As such, they are designed to provide hydrodynamic lift to the boat sufficient to support between 25% and 40% of the design gross weight of the boat when the air in the air space is within the design pressure range, and the boat is moving at a speed that will cause the hulls to plane. This is the mode of operation shown in FIG. 9C. The hulls are also designed to support 100% of the design gross weight while maintaining the platform above the water level when the air space is at ambient pressure and the boat is stationary or below planing speed. This mode of operation is shown in FIG. 9A. The boat then can operate as a planing catarmaran when traveling at planing speed without air pressure in the air space. This mode of operation is shown in FIG. 9B.

When blowers or fans 30 are supplying the air space between the hulls with pressurized air, the air pressure acts against the bottom surface of the platform of the boat and provides a lifting force to help support the boat. The greater the air pressure, of course, the greater the upward force of the air against the bottom of the platform and the higher the boat will ride in the water.

In accordance with this invention, the hulls are designed to provide a hydrodynamic lift sufficient to support about 25% of the boat when the boat is moving at planing speed and the rest of the gross weight is supported by the air pressure in the air space. Therefore, the hulls should not be lifted out of the water beyond a certain distance. This can be controlled by controlling the air pressure. It is a feature of this invention to control the maximum height of the boat by the design of the flexible seals. Thus, the forward seal is designed to allow air to begin to escape when the boat is at the desired height above the water. The escaping air blows a spray ahead of the boat, which provides an easily observable indication to the operator that he is maintaining the proper pressure in the air space.

Figure 4:
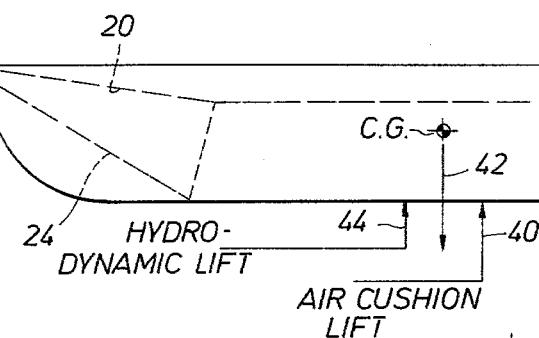
FIG. 4 is a schematic side view of a boat designed in accordance with this invention to position the center of the buoyant force of the hulls and the air cushion or bubble with respect to the center of gravity of the boat so as to prevent the bow of the boat from falling downwardly into the water should the air pressure be lost.

Should the pressure in the air space be suddenly lost, the boat will drop rapidly into the water. If this occurs while the boat is traveling at or near its cruise speed, the sudden dropping of the boat into the water can produce tremendous impact forces on the boat structure. In addition, if the center of lift of the air cushion is about in line with the center of gravity of the boat and the upward hydrodynamic force provided by the hull, the boat will tend to nose down when the pressure is lost causing the bow of the boat to dig into the water. This again is an undesirable result and, in accordance with one feature of this invention, as shown in FIG. 4, the air space and the hulls of the boat are designed so that the center of upward force provided by the air cushion, as indicated by force vector 40, is positioned rearwardly of the center of gravity of the boat, as indicated by force vector 42. To oppose this moment, the hydrodynamic force provided by hulls 10 and 12 is arranged to act along the line indicated by force vector 44. With this arrangement, should the air cushion lift be lost suddenly, as occurs in this type boat, the hydrodynamic lift force would provide a "bow-up" moment that would momentarily urge the bow of the boat away from the water and thus tend to prevent the bow from crashing into the water.

Figure 5:
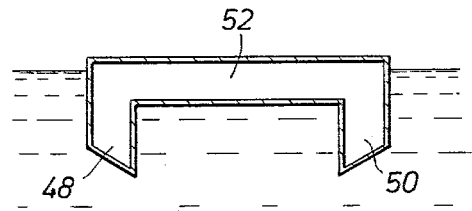
FIG. 5 is a cross section of a typical prior art surfact effect boat showing how the platform is used to provide buoyancy to support the weight of the boat when the boat is not being supported by air pressure.
Figure 8A:
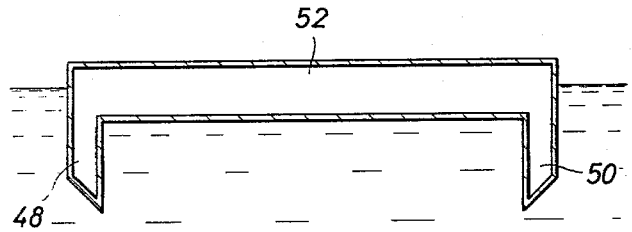
FIGS. 8A and 8B show the typical surface effect boat of FIG. 5 as it operates with and without air pressure.
Figure 8B:
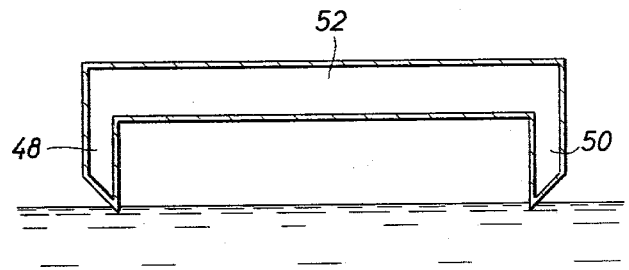

As stated above, it is one of the features of this invention to provide a surface effect boat having hulls that support the boat at all times whether the boat is "on the bubble" or not. This results in a boat that is highly maneuverable whether it is supported by the air cushion or not. This is important when the boat is operating in the open sea, for example, as a crew boat or a supply boat that has to maneuver and handle well around drilling platforms and the like. This maneuverability was not present, heretofore, in surface effect boats because they sink deep into the water. For example, as shown in FIGS. 5 and 8B, typical prior art surface effect boats used side hulls, such as hulls 48 and 50, that could not provide sufficient buoyancy to support the platform above the water without air pressure. This was because the purpose of the design of such boats was for the air pressure to lift the boats as far out of the water as possible so that the smallest amount of structure possible was in engagement with the water. This was done to reduce drag to a minimum. When the boat loses its air cushion support, however, and must rely on its displacement buoyancy, then the boat loses a tremendous amount of its seaworthiness and cannot be easily handled in the open sea. In FIGS. 9A and 9B, the position of the boat of this invention is shown in two modes of operation when it is not being supported by the air bubble. In each mode it is a catamaran. As such, it is easily maneuvered by the two propulsion motors 34 and 36 in either the first mode of FIG. 9A, where it is supported solely by the buoyant forces produced by the hull displacement, or the second mode of FIG. 9B, where the hulls are planing and providing hydrodynamic forces to support the boat.

It has also been found that the boat performs better when certain relationships are maintained between the width of the air space b and the beam of the boat B and the length to beam ratio. Preferably, the ratio of b to B is maintained between 0.3 and 0.5. The length to beam ratio should be maintained at approximately 2.

Figure 6:
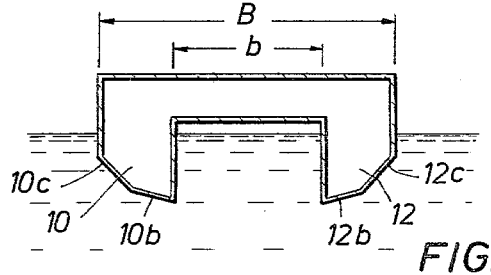
FIG. 6 is a schematic cross-sectional view of a boat embodying this invention showing how the boat is supported by the hulls even though there is no air pressure in the air space beneath the boat.

The hulls, as explained above, are planing hulls. Therefore, they are provided with planing surfaces 10b and 12b that function when the boat is operating on the bubble, as shown in FIG. 9B. This shape hull is obtained by the double chine configuration shown in FIGS. 3 and 6.

Figure 7:
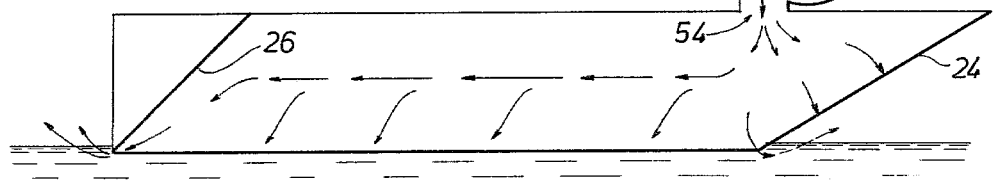
FIG. 7 is a schematic view showing the manner of introducing air into the air space so that it impinges against the forward seal to urge the forward seal into contact with the water.

Forward seal 24 receives the impact of the waves through which the boat travels as it moves over the surface of the water. The seal is inclined downwardly toward the rear and the impact of the waves will tend to move the seal out of contact with the water. To assist the seal in maintaining its contact with the water and to provide a restoring force to quickly move the seal back into contact with the water after it has been hit by a large wave, discharge port 54 is arranged so that the air being pumped into the air space, as shown in FIG. 7, impinges against forward seal 24 and holds the seal in contact with the water and will quickly restore the seal to such position after it has been moved upwardly by a large wave. As shown, some of the air is escaping around the bottom of the seal toward the front of the boat. As explained above, an operator can maintain the pressure at the desired level in the air space by observing the spray of water produced in the front of the boat by the air escaping around the forward seal. When this begins to occur, he knows that he has the proper pressure in the air space for the particular load on the boat at that time.

As explained above, it is an object and feature of this invention to provide a surface effect boat that has an improved, smoother ride in rough water. This is accomplished by the combination of an air space formed between two spaced hulls that are shaped as planing hulls. This arrangement provides inherent stability in the event of a sudden loss of air pressure while the boat is moving at planing speed, since the hulls will automatically provide sufficient hydrodynamic forces to support the boat which will then act as a planing hull catamaran.

This combination also provides a smoother ride, particularly in heavy seas. This results from carrying a portion of the weight of the boat in two separate and distinct fluids, air and water. The effects of wave encounters on the portion of the boat supported by air and by water are different. Impact of the hulls with the waves, results in accelerations due to forces acting over a localized portion of the hulls. Accelerations that develop due to the cushion area encountering waves act over the total cushion area. The response time of each of these is different and, in fact, in the event of a large wave accelerating the boat upward due to creating an excessive air pressure, negative hydrodynamic forces will develop due to the virtual mass of the water that surrounds the hulls, thus stabilizing the boat. In the event of wave impact upon the planing portion of the catamaran hull, the boat may be accelerated upward increasing the air volume and reducing the air pressure between the hulls and thereby reducing the total air cushion lift. This stabilizing phenomenon can be best described as a spring mass system with two different spring rates, with one spring rate providing damping characteristics for the other. Conventional planing crafts and surface effect boats are basically systems that have a mass at only one spring rate. In the event that the frequency of the encounter of waves matches the spring rate, violent motions can be expected. The boat of this invention, however, has both the lift created by the dynamic forces on the catamaran hulls and the aerostatic lift from the bubble. This tends to null accelerations, because the accelerating forces act in a sequence and at various force centers of the vehicle. An analogy of this phenomenon would be an aircraft making a take off from a rough field on a very gusty day. Initially, the aircraft is effected by the bumps in the runway, since there is no aerodynamic damping. As a plane increases speed, a larger portion of the load is supported by the aerodynamic sections and the ride is improved. However, as the plane takes off, it is purely at the mercy of the gusts that may develop and large vertical excursions may be encountered. In the period where the plane is partially supported by the rough runway and by the gusty forces acting on aerodynamic surfaces, with neither force being large and not acting in unison, the plane will experience minimum accelerations.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the apparatus and structure of this invention without departing from the scope thereof, it is to be understood that all matter herein set forth or shown in the accompanying drawings is to be interpreted as illustrative and not in a limiting sense.

The invention having been described, what is claimed is:

1. A surface effect boat of the captured air bubble type for transporting loads over water and comprising:
   (a) a pair of hull means having in use hydrodynamic supporting forces responsive to hull means motion and displacement in water for supporting said surface effect boat and a load upon the water;
   (b) platform means for connecting said pair of hull means in a specific ratio of over-all boat length to boat width to define an air space therebetween in a specific ratio of widths of said platform means and said air space bounded by said platform means and depending hull means at the top and sides respectively;
   (c) flexible curtain means fixed to and depending from said platform means and adapted for closing the ends of said air space; and
   (d) air pressure means mounted on said surface effect boat and adapted to pressurize said air space for jointly supporting said boat and load in combination with said hull hydrodynamic supporting forces in a dual air-water spring mass system having respective spring rates with complementary dampening characteristics for stabilizing progress of said surface effect boat through water, and wherein said hull means has a center of gravity centered aft of said hydrodynamic supporting forces and forward of a center of said pressurized air space supporting force, whereby said surface effect boat is displaced in trim upwardly forward when said air space is depressurized.

* * * * *